US012778141B1

(12) United States Patent
Vushaj

(10) Patent No.: US 12,778,141 B1
(45) Date of Patent: Nov. 3, 2026

(54) PIZZA PEEL APPARATUS

(71) Applicant: Zef Vushaj, Bronx, NY (US)

(72) Inventor: Zef Vushaj, Bronx, NY (US)

( * ) Notice: Subject to any disclaimer, the term of this patent is extended or adjusted under 35 U.S.C. 154(b) by 596 days.

(21) Appl. No.: 18/375,538

(22) Filed: Oct. 1, 2023

(51) Int. Cl.
*A21B 3/00* (2006.01)
*A47J 43/28* (2006.01)

(52) U.S. Cl.
CPC ............. *A21B 3/003* (2013.01); *A47J 43/288* (2013.01)

(58) Field of Classification Search
CPC ......... A21B 3/003; A47J 43/28; A47J 43/283; A47J 43/288
USPC ........................................................ 294/7, 49
See application file for complete search history.

(56) References Cited

U.S. PATENT DOCUMENTS 1,135,906 A 4/1915 Ludwig
1,747,258 A 2/1930 O'Neil
2,003,541 A 6/1935 Jawort
2,193,341 A * 3/1940 Mehringer ............ A47J 43/283 294/51
3,525,339 A * 8/1970 Halligan ................ A61B 17/22 606/190
5,072,486 A * 12/1991 Guarascio .............. B44D 3/162 401/289
5,417,463 A 5/1995 DiPaola
5,716,086 A 2/1998 Bifulco
11,523,616 B2 * 12/2022 Mecsaci ................. A21B 3/003
2002/0180226 A1 12/2002 Moreth
2004/0156963 A1 8/2004 Amoroso
2008/0209738 A1 * 9/2008 Laufer .................. A47J 43/288 294/7

* cited by examiner

*Primary Examiner* — Paul T Chin
(74) *Attorney, Agent, or Firm* — Goldstein Law Offices, P.C.

(57) ABSTRACT

A pizza peel apparatus includes an elongate handle, a planar head having a top surface, and a channel. The planar head extends from the elongate handle and includes multiple elongate bars such that a first edge of one elongate bar is coupled to a second edge of an adjacent elongate bar. The channel is disposed within the elongate handle and extends into the planar head. One or more branches extends away from the channel within the planar head. An opening in the top surface is in fluid communication with the channel and/or branch such that the opening directs an airflow onto the top surface.

20 Claims, 15 Drawing Sheets

PIZZA PEEL APPARATUS

TECHNICAL FIELD

The present disclosure relates generally to culinary devices. More particularly, the present disclosure relates to culinary devices for preparing pizza.

BACKGROUND

Pizza-making is a multi-billion-dollar industry that provides one of the most popular foods to people worldwide. In restaurants, pizza dough and its toppings are commonly slid into a dome-shaped wood or coal-fired brick oven and cooked directly on the oven surface. A large spatula or pizza peel is often used to move the pizza into and out of the oven.

Portions of the pizza dough, however, may stick to the pizza peel when the pizza is being offloaded into the oven. To avoid deforming the shape of the pizza as a result of sticking, a pizza maker will typically lift the edge of the pizza and blow underneath the pizza crust between the pizza crust and the pizza peel or may use their fingers to shift and "unstick" the pizza from the pizza peel to get it into the oven. This process tends to be unsanitary as well as unreliable in preventing distortion of the pizza's shape.

Accordingly, there is a need for a pizza peel that facilitates sliding an uncooked pizza into an oven without requiring physical contact or manipulation of the pizza dough. Also what is needed is a pizza peel that introduces air between the pizza dough and the pizza peel in a sanitary manner. Beneficially, such a pizza peel would be durable and easy to manufacture.

BRIEF SUMMARY

According to one aspect of the present disclosure, a pizza peel apparatus configured to support a pizza includes an elongate handle extending between a first end and a second end along a longitudinal axis. A planar head extends from the elongate handle and includes multiple elongate bars forming a top surface and a bottom surface. The elongate bars are coplanar and each elongate bar includes a first edge and a second edge. The first edge of one elongate bar is coupled to the second edge of an adjacent elongate bar.

The channel is integrated into the elongate handle such that it extends through at least a portion of the planar head along the longitudinal axis. The channel includes at least one branch extending in a direction away from the longitudinal axis within the planar head. At least one opening extends through the top surface from the channel and/or branch and is in fluid communication with a fluid path formed by the channel and the branch. The opening is configured to direct an airflow onto the top surface of the planar head.

In some embodiments, the pizza peel apparatus includes an air pump coupled to the first end of the elongate handle and configured to selectively pump air into the channel to create the airflow. In certain embodiments, the air pump extends along the longitudinal axis.

In some embodiments, the first edge of each of the elongate bars includes a tongue element and the second edge of each of the elongate bars comprises a groove element. The tongue element may be configured to engage the groove element to couple the first edge of one of the elongate bars to the second edge of an adjacent elongate bar.

Each of the elongate bars may include a proximal end, a distal end, and a length therebetween. In some embodiments, the length of each of the elongate bars is substantially aligned to form the planar head. In certain embodiments, at least a portion of the elongate handle is substantially aligned with the length of each of the elongate bars to form the planar head. In one embodiment, the second end of the elongate handle is substantially aligned with the distal end of at least one of the elongate bars.

In certain embodiments, one or more branches extends through more than one of the elongate bars. In some embodiments, multiple openings are substantially evenly distributed relative to the top surface of the planar head.

Another aspect of the present disclosure includes a method of making a pizza peel apparatus. In some embodiments, the method includes providing an elongate handle extending between a first end and second end along a longitudinal axis. The method further includes integrating a channel into the elongate handle that extends along the longitudinal axis between the first end and the second end.

In some embodiments, the method includes providing an elongate handle extending between a first end and a second end along a longitudinal axis. The method further includes coupling to the elongate handle at least one of multiple elongate bars to form a planar head having a top surface and a bottom surface. The elongate handle and each of the elongate bars are coplanar.

In some embodiments, the method includes integrating into the elongate handle a channel extending along the longitudinal axis. One or more branches may be integrated into the channel such that the branch is in fluid communication with the channel and extends in a direction away from the longitudinal axis within the planar head. The channel and the one or more branches form a fluid path configured to direct an airflow therethrough.

The method further includes forming through the top surface at least one opening in fluid communication with the fluid path. The opening is configured to direct the airflow onto the top surface of the planar head.

In some embodiments, the method further includes coupling to the first end of the elongate handle an air pump in fluid communication with the fluid path. The air pump is configured to produce the airflow. In some embodiments, each of the elongate bars includes a proximal end, a distal end, and a length therebetween. Coupling the elongate handle to at least one of the elongate bars may include substantially aligning the second end of the elongate handle with the distal end of the elongate bars.

In some embodiments, each of the elongate bars includes a first edge and a second edge. The first edge of one of the elongate bars is coupled to the second edge of an adjacent one of the elongate bars. In some embodiments, the first edge of one of the elongate bars is secured to the second edge of the adjacent elongate bar with a fastener.

In some embodiments, the method includes forming a tongue element extending along at least a portion of the first edge and/or forming a groove element extending along at least a portion of the second edge. Each of the tongue element and the groove element extends in a direction parallel to the longitudinal axis. In some embodiments, the method includes coupling the tongue element of one of the elongate bars with the groove element of an adjacent one of the elongate bars to form the planar head. In some embodiments, the method further includes trimming a perimeter of the planar head to form a substantially circular shape.

In some embodiments, integrating the branch with the portion of the channel includes extending the branch in a substantially perpendicular direction through more than one of the elongate bars. In certain embodiments, forming at least one opening through the top surface includes forming multiple openings through the top surface such that the multiple openings are substantially evenly distributed relative to the top surface of the planar head.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

As discussed above, pizza makers throughout the ages have relied on unsanitary and unpredictable processes to transfer uncooked pizza into an oven without compromising the shape of the pizza prior to cooking. The present disclosure addresses these and other issues.

Figure 1:
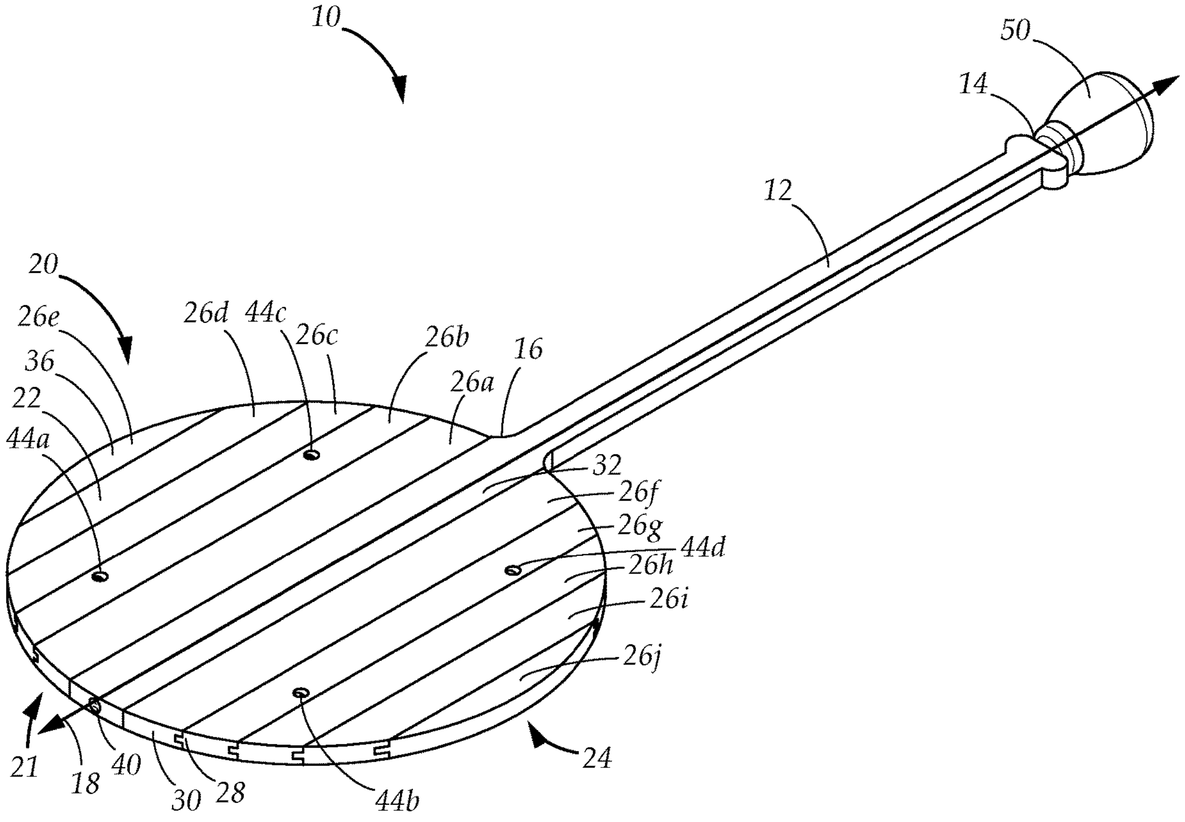
FIG. 1 is a top perspective view of a representative embodiment of a pizza peel apparatus in accordance with some embodiments.
Figure 2:
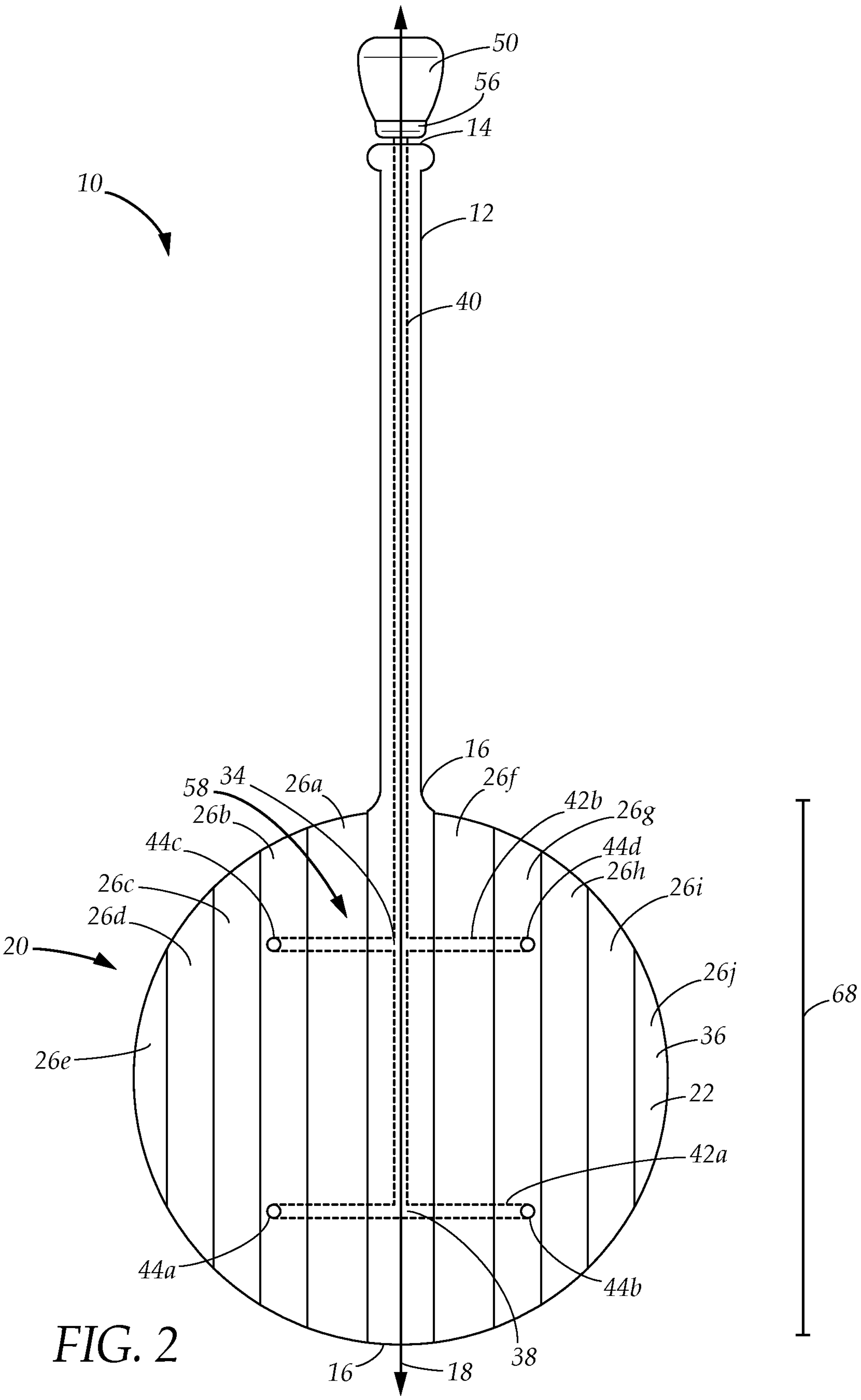
FIG. 2 is a top view of a representative pizza peel apparatus showing one embodiment of a fluid path including a channel and intersecting branches in accordance some embodiments.

Referring now to FIGS. 1 and 2, in some embodiments, a pizza peel apparatus 10 includes a durable, heat-safe, food-grade wood material such as cherry, maple, mahogany, acacia, bamboo, poplar, alder, birch, and/or any other suitable type of wood or combination of woods. In some embodiments, at least a portion of the pizza peel apparatus 10 includes a non-wood natural or synthetic material such as metal, plastic, for example. The pizza peel apparatus 10 may have a strength and rigidity sufficient to support the weight of a pizza or other food item retained thereon.

In some embodiments, the pizza peel apparatus 10 includes an elongate handle 12 extending between a first end 14 and a second end 16 along a longitudinal axis 18. In some embodiments, the elongate handle 12 is substantially planar. In other embodiments, the elongate handle 12 is substantially cylindrical or forms another suitable three-dimensional shape about the longitudinal axis 18. In certain embodiments, at least a portion of the elongate handle 12 may be ergonomically shaped to support a user's grip.

A planar head 20 may extend from at least a portion of the elongate handle 12. The planar head 20 may include a top surface 22 and a bottom surface 24. In some embodiments, the top surface 22 of the planar head 20 may be smooth and/or polished to facilitate sliding a pizza or other food item from the planar head 20 onto another surface. In these and other embodiments, however, the top surface 22 may be untreated with any chemicals or varnish so as to avoid contaminating any food supported thereon.

In some embodiments, the second end 16 of the elongate handle 12 substantially aligns with a distal edge 21 of the planar head 20. In one embodiment, the planar head 20 extends from the elongate handle 12 in opposing lateral directions. The planar head 20 may include a circle, square, oval, or any other suitable regular or irregular shape having dimensions sufficient to support a pizza. In some embodiments, the planar head 20 may have dimensions sufficient to accommodate a round pizza having a diameter of ten (10) inches, fourteen (14) inches, and/or sixteen (16) inches. In these and other embodiments, dimensions of the planar head 20 may be selected and/or customized to accommodate a pizza, calzone, and/or other food item having any desired size.

In certain embodiments, the elongate handle 12 and/or multiple elongate bars 26*a*-26*j* are joined together to form the planar head 20. In some embodiments, the elongate bars 26*a*-26*j* and at least a portion of the elongate handle 12 are coplanar such that the planar head 20 forms a top surface 22 and a bottom surface 24.

Each of the elongate bars 26*a*-26*j* may include a first edge 28 and a second edge 30. In some embodiments, the elongate bars 26*a*-26*j* are disposed such that the first edge 28 of one of the elongate bars 26*a*-26*j* is coupled to the second edge 30 of an adjacent elongate bar 26*a*-26*j*. In some embodiments, adjacent elongate bars 26*a*-26*j* are coupled together via one or more mechanical fasteners or fastening techniques, such as screws, nails, bolts, rivets, grommets, adhesives, a press fit, and/or any other suitable mechanical fastening device and/or mechanism.

In some embodiments, at least one channel 40 is integrated into the elongate handle 12 and extends through at least a portion of the planar head 20. In one embodiment, the channel 40 extends along the longitudinal axis 18. In one embodiment, the channel 40 extends through at least half of a length 68 of the planar head 20. In other embodiments, more than one channel 40 extends through the elongate handle 12 and at least a portion of the planar head 20. In some embodiments, multiple channels 40 join together to form a single channel 40 at or near the planar head 20. In other embodiments, multiple channels 40 extend in parallel through the elongate handle 12 and the planar head 20.

In certain embodiments, the channel 40 includes at least one branch 42*a*, 42*b* extending in a direction away from the longitudinal axis 18 within the planar head 20. For example, the branch 42*a*, 42*b* may be disposed at an angle with respect to the channel 40 and the longitudinal axis 18. In some embodiments, the branch 42*a*, 42*b* may extend perpendicularly from the channel 40 with respect to the longitudinal axis 18.

In some embodiments, the branch 42*a*, 42*b* intersects the channel 40 such that the branch 42*a*, 42*b* extends from opposing sides of the channel 40. In one embodiment, a first branch 42*a* intersects the channel 40 at the end 38 of the channel 40 and a second branch 42*b* intersects the channel 40 at a position 34 disposed along a length of the channel 40. Each branch 42*a*, 42*b* may intersect the channel 40 at approximately a ninety degree (90°) angle. In these and other embodiments, the branches 42*a*, 42*b* may be substantially evenly distributed with respect to the top surface 22 of the planar head 20. In certain embodiments, one branch 42*a*, 42*b* and/or channel 40 may intersect or join with another branch 42, 42*b* and/or channel 40 to form a fluid path 58.

Figure 3:
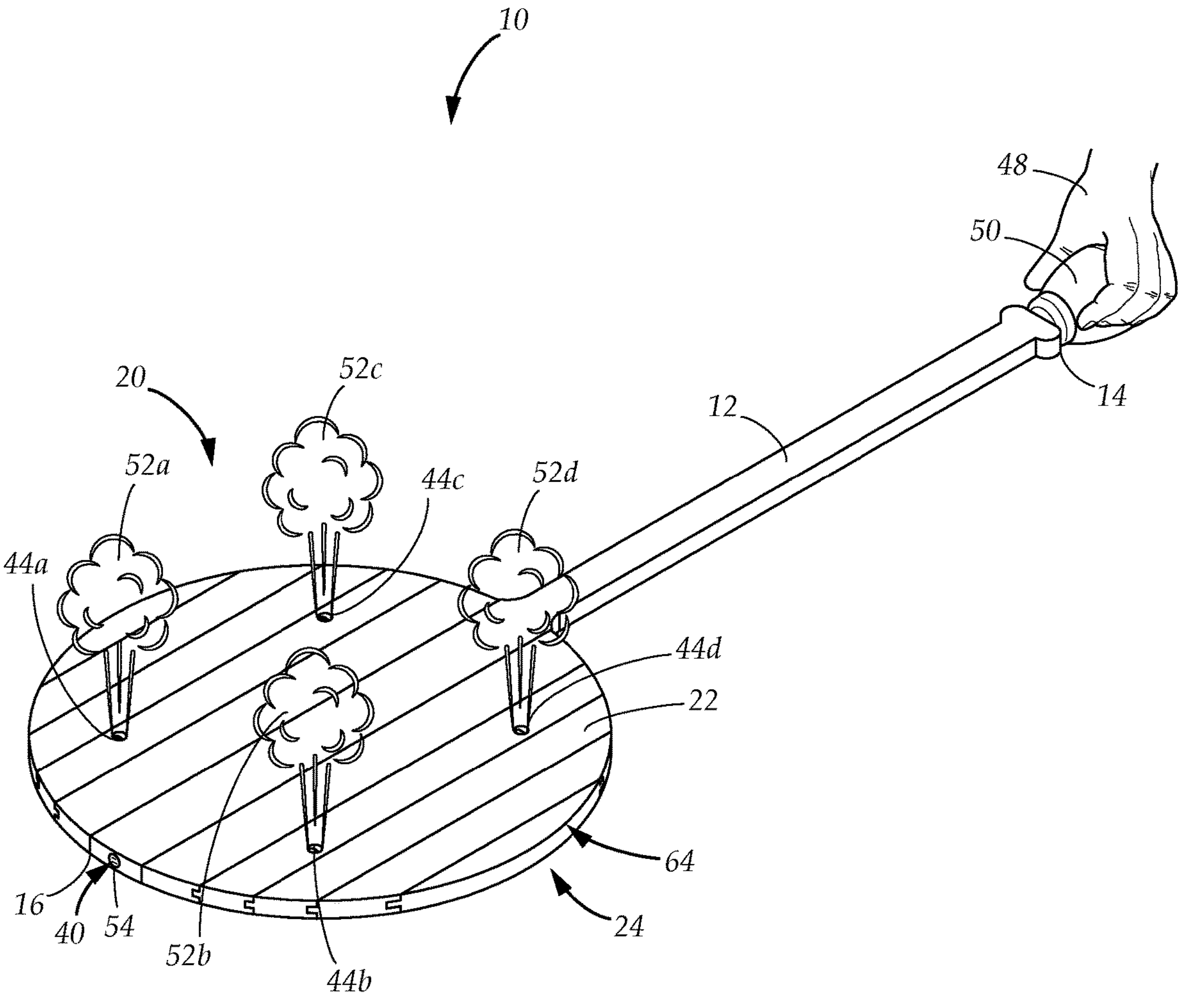
FIG. 3 is a top perspective view of one embodiment of a pizza peel apparatus showing air expelled through multiple openings in the top surface in accordance with some embodiments.

In some embodiments, at least one opening 44*a*-44*d* extends through the top surface 22 such that the opening 44*a*-44*d* is in fluid communication with the channel 40 and/or a branch 42*a*, 42*b*. In certain embodiments, multiple openings 44*a*-44*d* are in fluid communication with a fluid path 58 formed by the channel 40 and the branch 42*a*, 42*b*. In one embodiment, a first opening 44*a* is disposed at an end of a first branch 42*a* and a second opening 44*b* is disposed at an opposite end of the first branch 42*a*. Similarly, a third opening 44*c* may be disposed at an end of a second branch 42*b* and a fourth opening 44*d* may be disposed at an opposite end of the second branch 42*b*. As shown in FIG. 3, while still referring to FIGS. 1 and 2, one or more of the openings 44*a-d* may be configured to direct an airflow 52*a*-52*d* through the fluid path 58 formed by the channel 40 and the branches 42*a*, 42*b*, and onto the top surface 22 of the planar head 20.

In some embodiments, the pizza peel apparatus 10 includes an air pump 50 configured to selectively pump air into the channel 40 to create an airflow 52*a*-52*d* onto the top surface 22 of the planar head 20. In some embodiments, the air pump 50 is coupled to the first end 14 of the elongate handle 12 such that the air pump 50 and the elongate handle 12 are co-axial. The air pump 50 may be coupled to the first end 14 of the elongate handle 12 via one or more fasteners or mechanisms such as a press fit, an adhesive, a screw, a nail, a rivet, a grommet, stitching, and/or the like.

In some embodiments, the air pump 50 includes an oblong elliptical shape or any other suitable shape. The air pump 50 may be fabricated from one or more substantially flexible or resilient, air-impermeable materials such as rubber, silicone, plastic, and/or any other suitable elastomeric or other suitable material. In some embodiments, the air pump 50 includes a structure and material selected such that the air pump 50 has an initial inflated state and is configured to automatically return to the initial inflated state in response to a release of applied pressure.

In some embodiments, the air pump 50 includes a depressable valve 56 such that the air pump 50 automatically draws in and retains a volume of air in response to a release of applied pressure, such as after being squeezed, depressed, or otherwise deformed. In some embodiments, the depressable valve 56 includes an aperture, slit, seam, or other suitable feature configured to automatically open to receive the volume of air in response to applied pressure. Similarly, the depressable valve 56 may automatically retain the volume of air within the air pump 50 in response to release of the applied pressure.

In some embodiments, the air pump 50 is coupled to the first end 14 of the elongate handle 12 such that the depressable valve 56 is aligned and in fluid communication with the channel 40. In this manner, the air pump 50 may be selectively actuated to force the volume of air into the channel 40, thereby producing the airflow 52*a*-52*d*.

Figure 4:
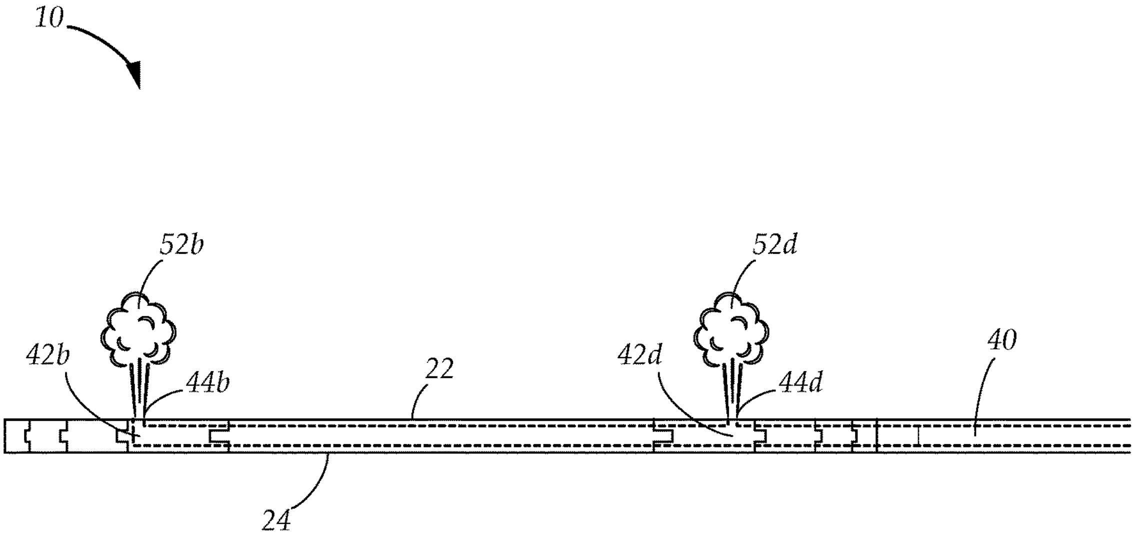
FIG. 4 is a side plan view of an embodiment of a pizza peel apparatus showing airflow expelled through openings disposed in the top surface of the planar head in accordance with some embodiments.
Figure 5:
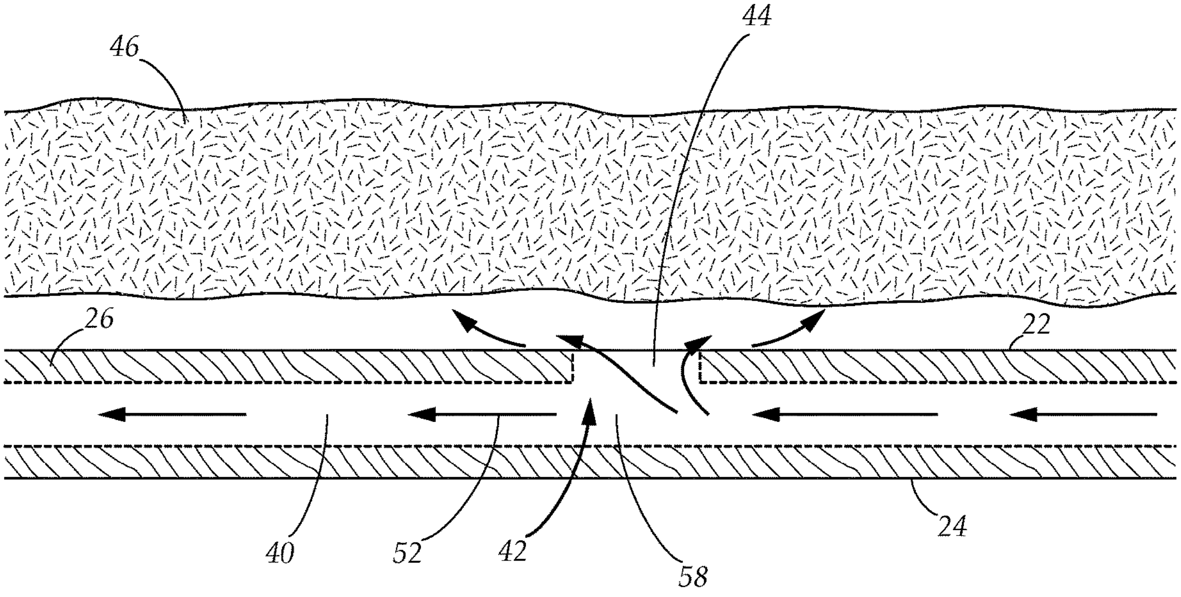
FIG. 5 is an enlarged side cross-sectional view of one embodiment of the pizza peel apparatus showing a representative fluid path in accordance with certain embodiments.

Referring now to FIGS. 3, 4, and 5, in some embodiments, the air pump 50 may be depressed, squeezed, or otherwise deformed by a user 48 to pump air from the air pump 50 into the channel 40 to produce the airflow 52*a*-52*d* configured to traverse the fluid path 58. The fluid path 58 may include the channel 40, at least one branch 42 in fluid communication with the channel 40, and/or an opening 44 extending between the channel or branch 42 and the top surface 22 of the planar head 20. In some embodiments, the fluid path 58 directs the airflow 52*a*-52*d* onto the top surface 22 of the planar head 20 through the openings 44*a*-44*d* to facilitate sliding a pizza 46 or other food item from the pizza peel apparatus 10 to another surface. Indeed, in some embodiments, the openings 44*a*-44*d* introduce at least a portion of the airflow 52*a*-52*d* between the top surface 22 of the planar head 20 and a pizza 46 or other food item supported thereon in a safe, sanitary, and efficient manner.

In some embodiments, one or more of the openings 44*a*-44*d* includes a circular, elliptical, square or other suitable shape. Each of the openings 44*a*-44*d* may include a diameter of about a quarter inch (¼ in.). The openings 44*a*-44*d* may be substantially uniform in shape and/or size or may vary. In one embodiment, multiple openings 44*a*-44*d* are disposed in the top surface 22 such that each opening 44*a*-44*d* is approximately six and a half inches (6½ in.) from an adjacent opening 44*a*-44*d*.

In some embodiments, more than one opening 44*a*-44*d* extends between a branch 42 and/or a channel 40 and the top surface 22. In some embodiments, multiple openings 44*a*-44*d* distribute the airflow 52*a*-52*d* across the entire top surface 22. In other embodiments, multiple openings 44*a*-44*d* distribute the airflow 52*a*-52*d* across at least a portion of the top surface 22. In some embodiments, the openings 44*a*-44*d* are substantially evenly spaced with respect to the top surface 22. In other embodiments, the openings 44*a*-44*d* are substantially concentrated in one portion of the top surface 22. For example, in one embodiment, a concentration of openings 44*a*-44*d* are centered with respect to the top surface 22. In some embodiments, at least some of the openings 44*a*-44*d* are distributed around or along a perimeter 64 of the top surface 22.

Figure 6A:
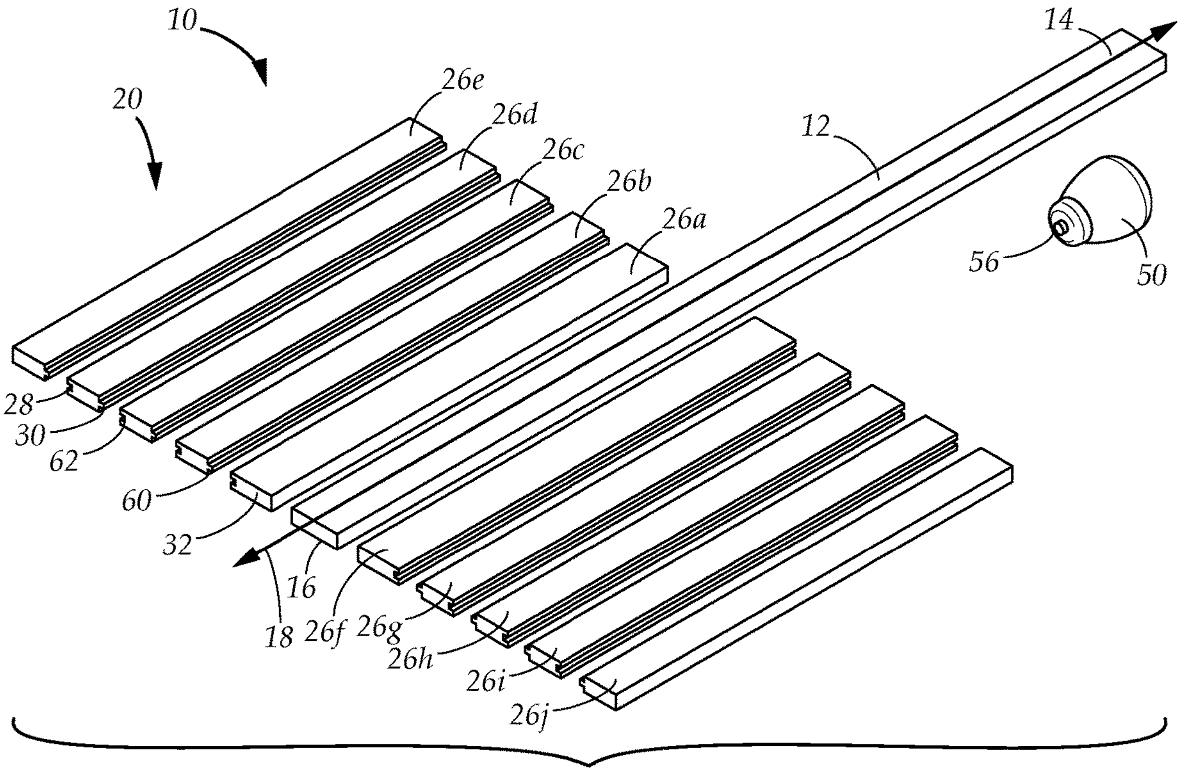
FIG. 6A is an exploded perspective view of a representative pizza peel apparatus showing multiple elongate bars and an air pump in accordance with certain embodiments.
Figure 6B:
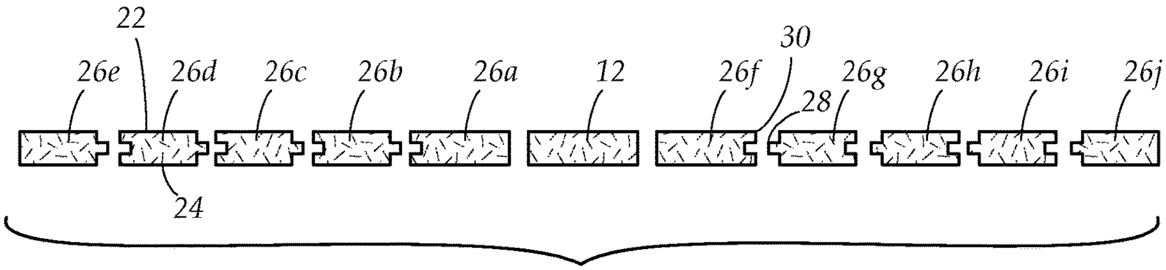
FIG. 6B is an end view of the multiple elongate bars of FIG. 6A.
Figure 6C:
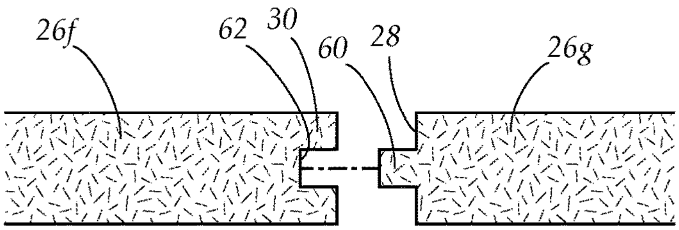
FIG. 6C is an enlarged end plan view of two of the elongate bars shown in FIG. 6B.

Referring now to FIGS. 6A-6C, in some embodiments, a method of making a pizza peel apparatus 10 in accordance with certain embodiments includes providing an elongate handle 12 that extends between a first end 14 and a second end 16 along a longitudinal axis 18. In some embodiments, the elongate handle 12 is substantially planar. For example, in one embodiment, the elongate handle 12 includes a width of approximately two inches (2 in.), a depth or thickness of approximately one-half inch (½ in.), and a length of approximately twenty-two inches (22 in.). In these and other embodiments, the elongate handle 12 may include a rectangular or square cross-sectional shape. In other embodiments, the elongate handle 12 may have a circular, polygonal, irregular, or any other suitable cross-sectional shape.

In some embodiments, the elongate handle 12 is coupled to one or more elongate bars 26*a*-26*j* to form the planar head 20. In some embodiments, the elongate bars 26*a*-26*j* and the elongate handle 12 are coplanar such that the planar head 20 includes a top surface 22 and a bottom surface 24. Each of the elongate bars 26*a*-26*j* may be substantially planar and may include a rectangular, square, or other suitable cross-sectional shape. In some embodiments, a shape and dimensions of each of the elongate bars 26*a*-26*j* is substantially uniform.

In certain embodiments, a shape and/or dimensions of each of the elongate bars 26*a*-26*j* is substantially similar to the shape and/or dimensions of at least a portion of the elongate handle 12. In this manner, the elongate bars 26*a*-26*j* and the portion of the elongate handle 12 may form a planar head 20 having a substantially uniform geometry. For example, in one embodiment, each of the elongate bars 26*a*-26*j* includes a width of approximately two inches (2 in.), a depth or thickness of approximately one-half inch (½ in.). A length of each of the elongate bars 26*a*-26*j* may vary depending on the desired size or diameter of the finished planar head 20. For example, the length of one or more of the elongate bars 26*a*-26*j* may be approximately twelve inches (12 in.) for a small pizza peel apparatus 10, approximately fourteen inches (14 in.) for a medium pizza peel apparatus 10, approximately sixteen inches (16 in.) for a large pizza peel apparatus 10, and approximately eighteen inches (18 in.) for an extra large pizza peel apparatus 10.

Referring now to FIGS. 8, 9, 11, and 13, while still referring to FIGS. 6A-6C, in some embodiments, at least a portion of the elongate handle 12 is coupled to the elongate bars 26*a*-26*j* via one or more mechanical fasteners 70*a*-70*h* such as a nail, a screw, a bolt, a rivet, a grommet, an adhesive, and/or any other suitable fastener. In some embodiments, the elongate bars 26*a*-26*j* are coplanar and each of the elongate bars 26*a*-26*j* includes a first edge 28 and a second edge 30. The first edge 28 of one of the elongate bars 26*a*-26*j* may be coupled to the second edge 30 of an adjacent one of the elongate bars 26*a*-26*j* to form the planar head 20. In some embodiments, one or more mechanical fasteners 70*a*-70*h* couples the first edge 28 of one of the elongate bars 26*a*-26*j* to the second edge of an adjacent elongate bar 26*a*-26*j*.

In these and other embodiments, the first edge 28 of each of the elongate bars 26*a*-26*j* may include a tongue element 60 and the second edge 30 of each of the elongate bars 26*a*-26*j* may include a groove element 62. The tongue element 60 may engage the groove element 62 to couple the first edge 28 of one of the elongate bars 26*a*-26*j* to the second edge 30 of an adjacent elongate bar 26*a*-26*j*.

In some embodiments, an adhesive may be applied to a surface of the tongue element 60 and/or groove element 62 to further secure adjacent elongate bars 26*a*-26*j*. In certain embodiments, the tongue element 60 and the groove element 62 each effectively increase a surface area of the first edge 28 and the second edge 30, respectively. In one embodiment, the tongue element 60 and/or the groove element 62 increases the surface area of the corresponding edge 28, 30 by at least three (3) times. In some embodiments, this increased surface area enables application of an increased amount of adhesive thereon, thereby facilitating increased or maximum security between adjacent elongate bars 26*a*-26*j* and/or between the elongate handle 12 and an adjacent elongate bar 26*a*-26*j*.

Figure 7A:
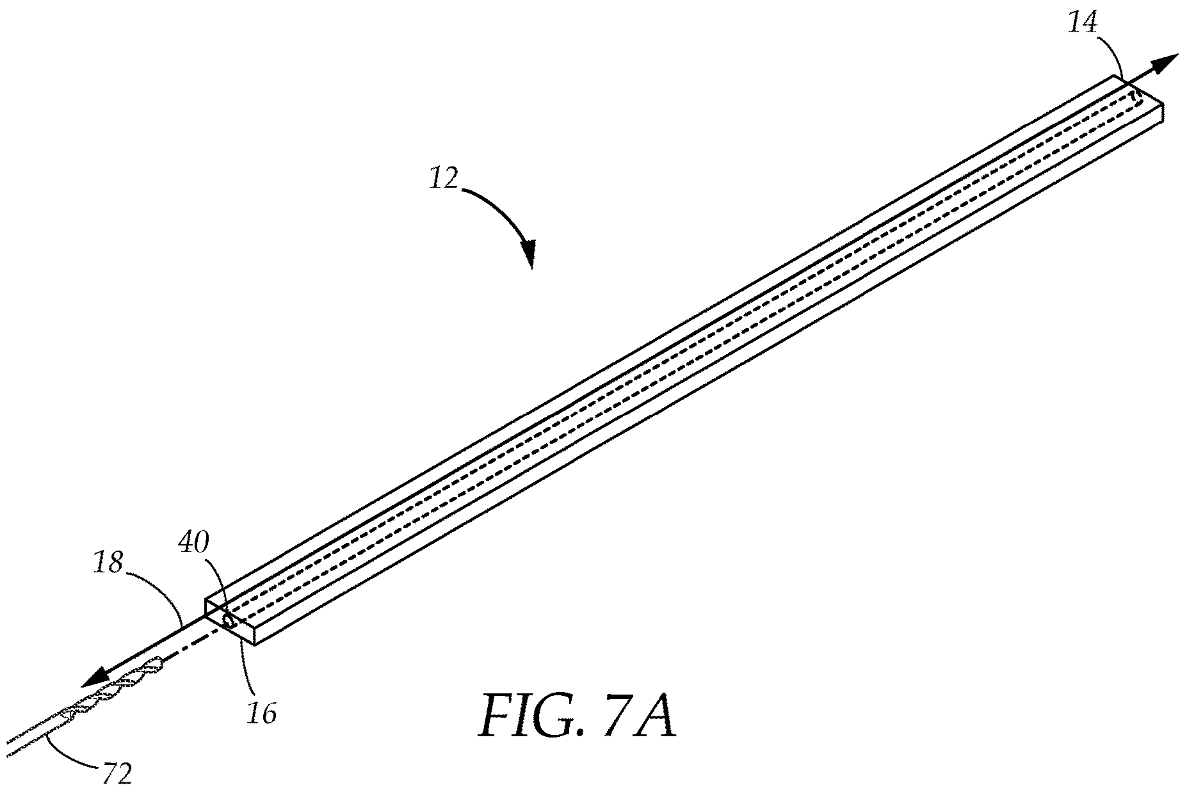
FIG. 7A is a perspective view of a representative elongate bar showing integration of a channel therein in accordance with certain embodiments.
Figure 7B:
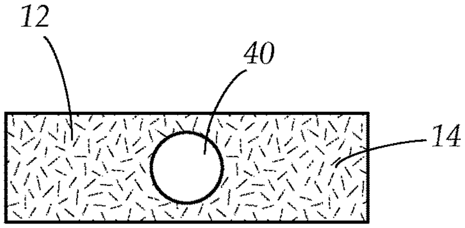
FIG. 7B is an end view of the elongate bar and channel of FIG. 7A.
Figure 8:
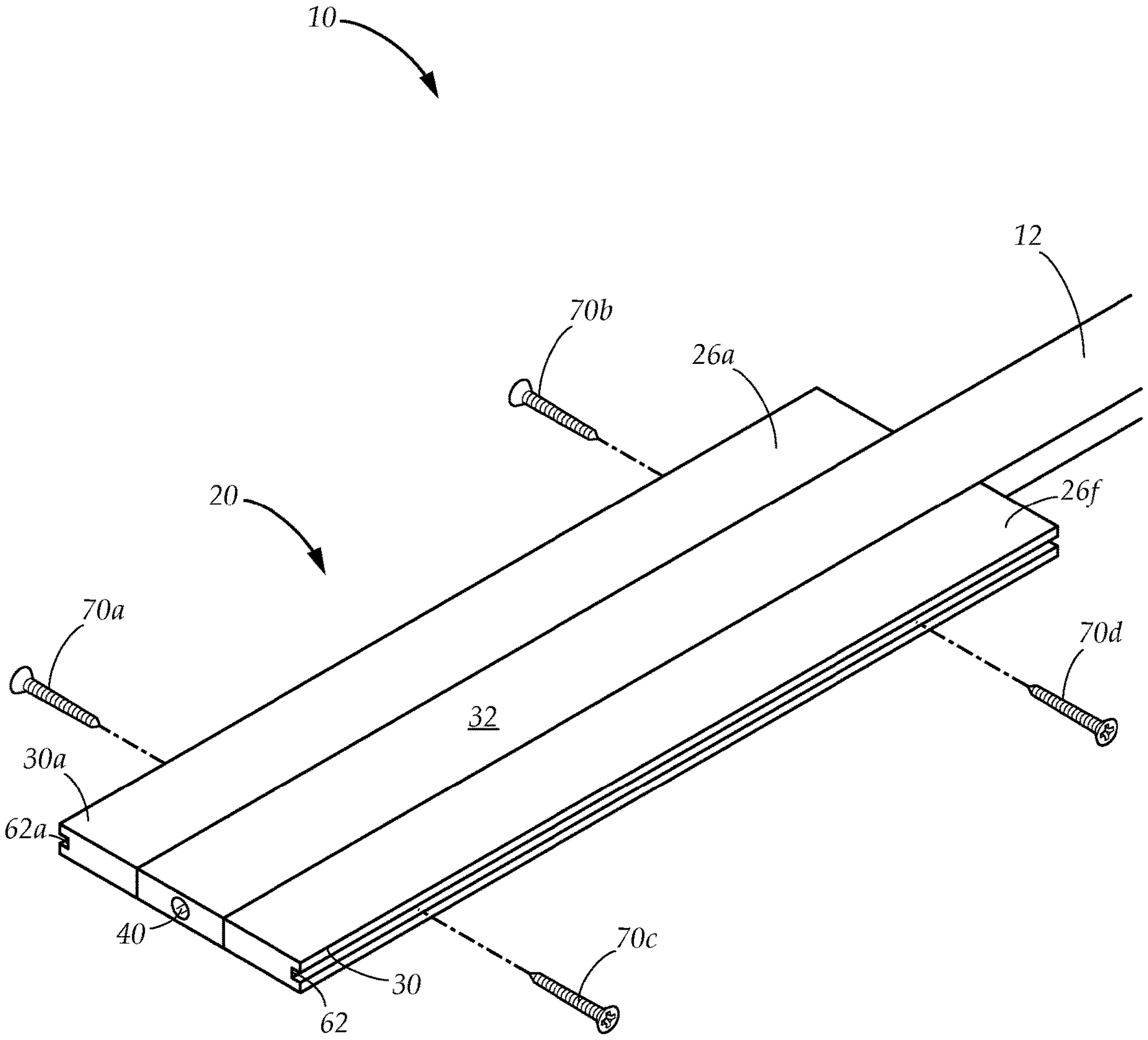
FIG. 8 is a perspective view of a portion of one embodiment of a pizza peel apparatus illustrating one embodiment of a step of a fabrication process in accordance with some embodiments.
Figure 9:
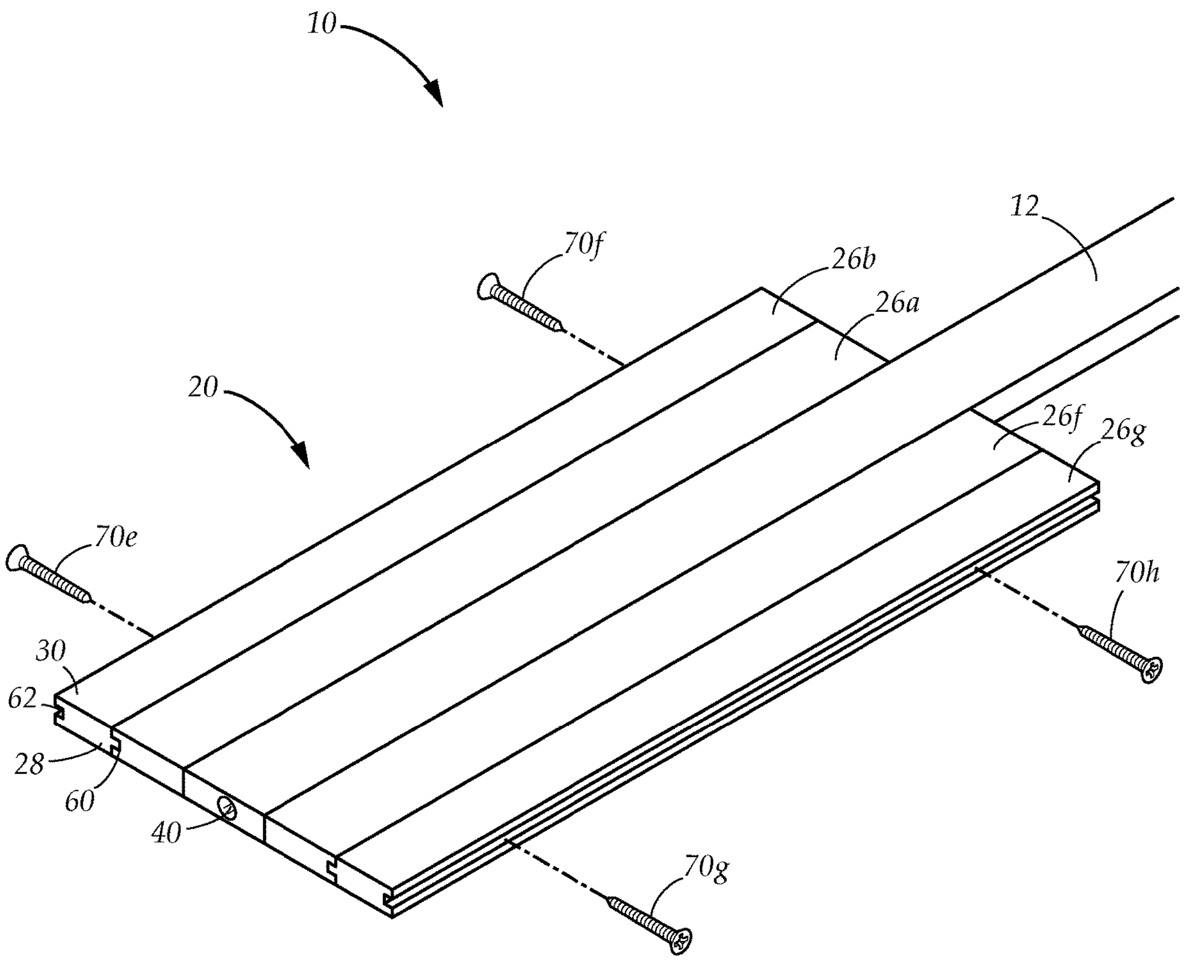
FIG. 9 is a perspective view of the pizza peel apparatus of FIG. 8 illustrating another step of the fabrication process in accordance with some embodiments.

Referring now to FIGS. 7A and 7B, in some embodiments, a channel 40 may be integrated into the elongate handle 12 such that the channel 40 extends along the longitudinal axis 18 between the first end 14 and the second end 16. In some embodiments, the channel 40 may extend along an entire distance between the first end 14 and the second end 16. In other embodiments, the channel 40 may extend along at least a portion of the distance between the first end 14 and the second end 16. A drill 72 or other suitable tool having desired cross-sectional dimensions may be used to form the channel 40 into the elongate handle 12. The resulting channel 40 may have dimensions commensurate with the dimensions of the drill bit 72 or other tool used to create it.

Figure 10:
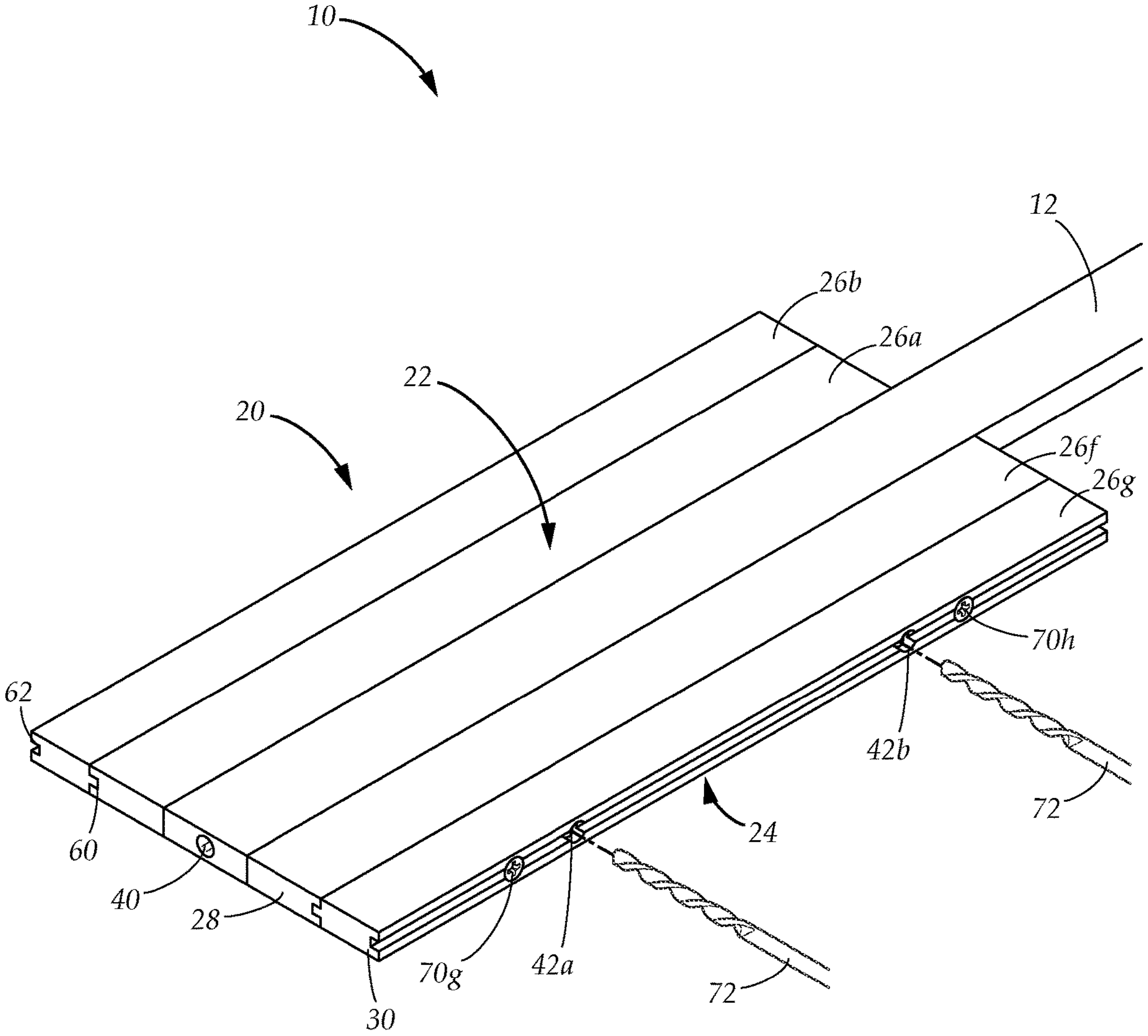
FIG. 10 is a perspective view of the pizza peel apparatus of FIG. 8 illustrating another step of the fabrication process in accordance with some embodiments.
Figure 11:
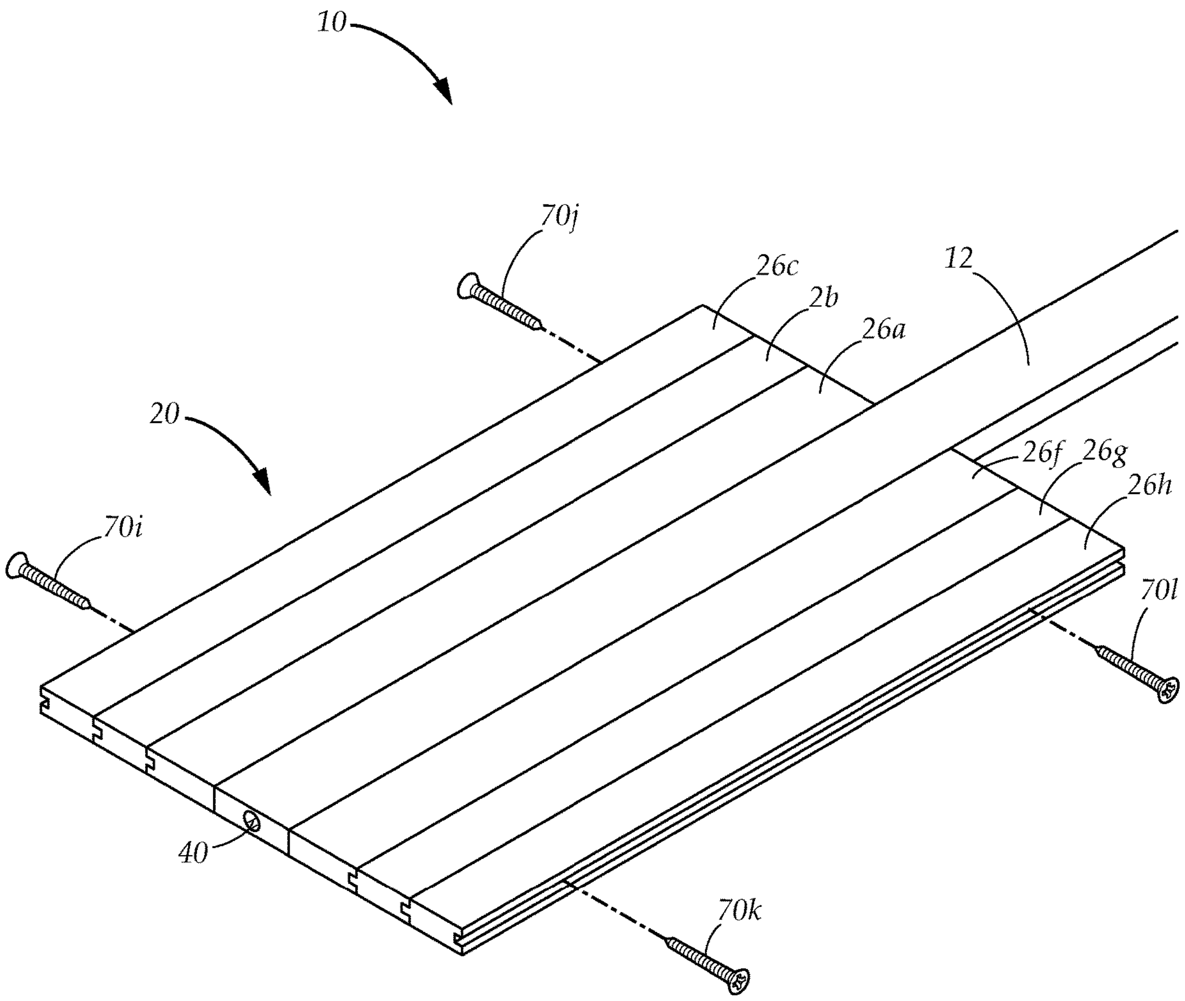
FIG. 11 is a perspective view of the pizza peel apparatus of FIG. 8 illustrating another step of the fabrication process in accordance with certain embodiments.
Figure 12:
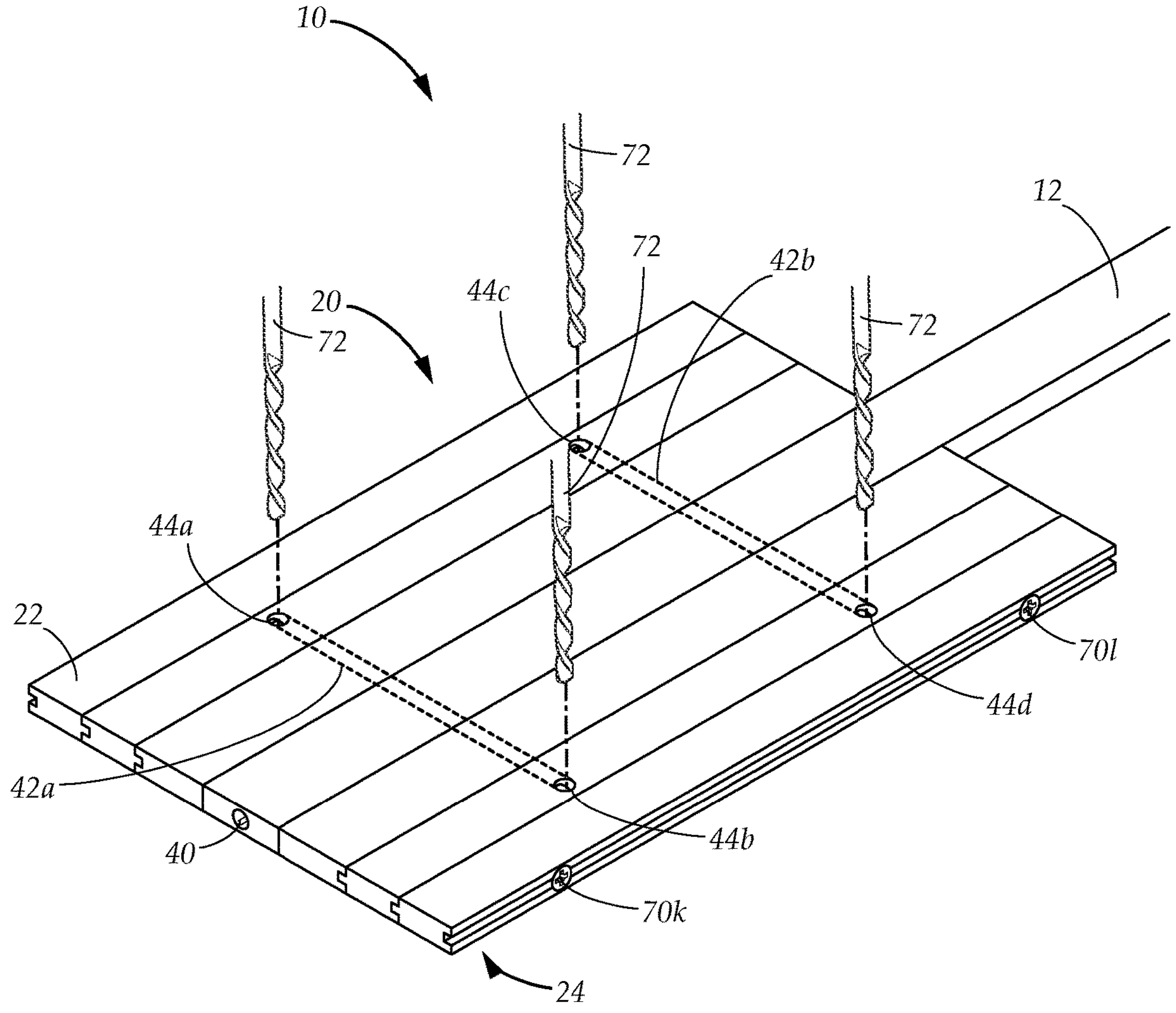
FIG. 12 is a perspective view of the pizza peel apparatus of FIG. 8 illustrating another step of the fabrication process in accordance with some embodiments.
Figure 13:
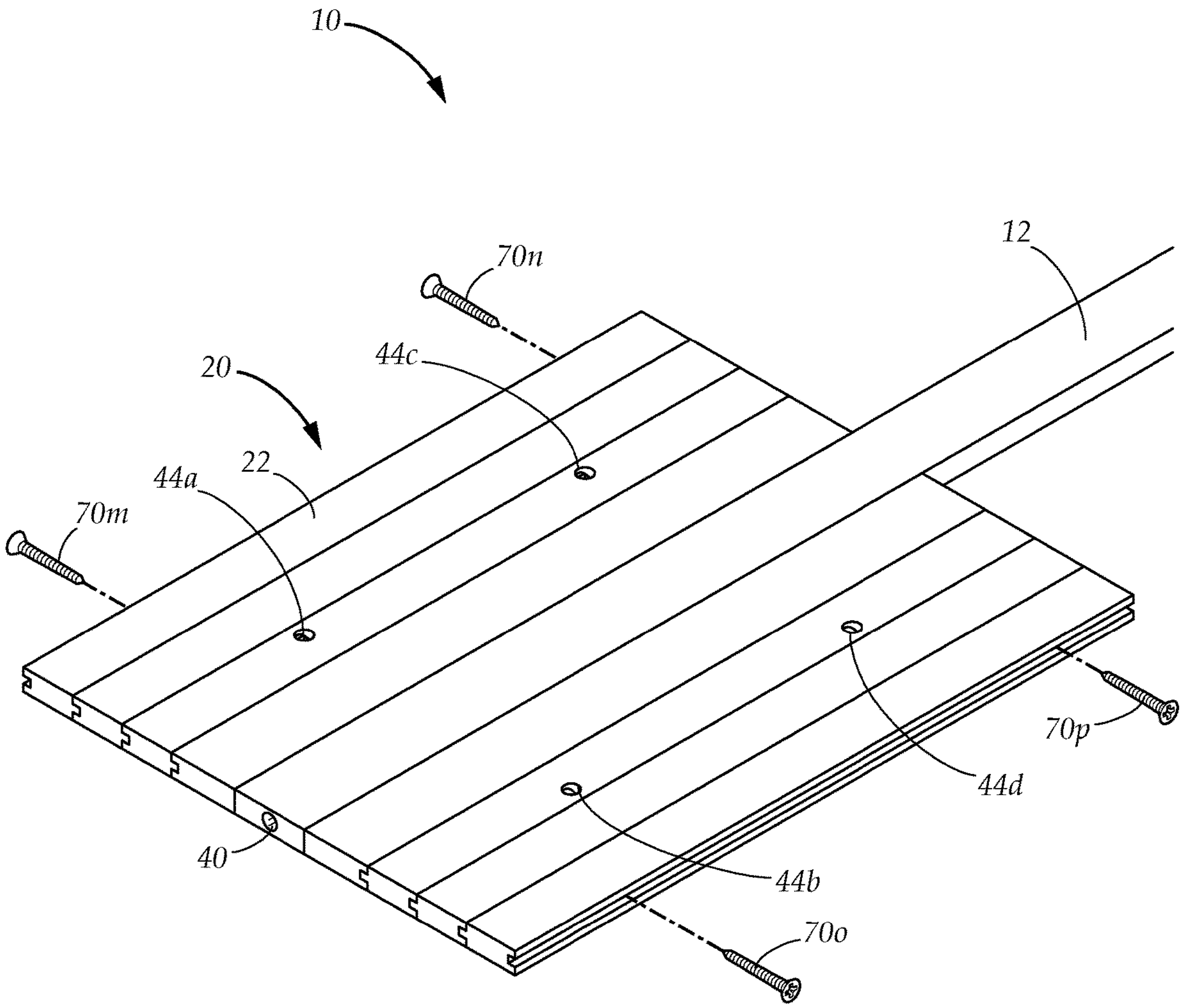
FIG. 13 is a perspective view of the pizza peel apparatus of FIG. 8 illustrating another step of the fabrication process in accordance with certain embodiments.
Figure 14:
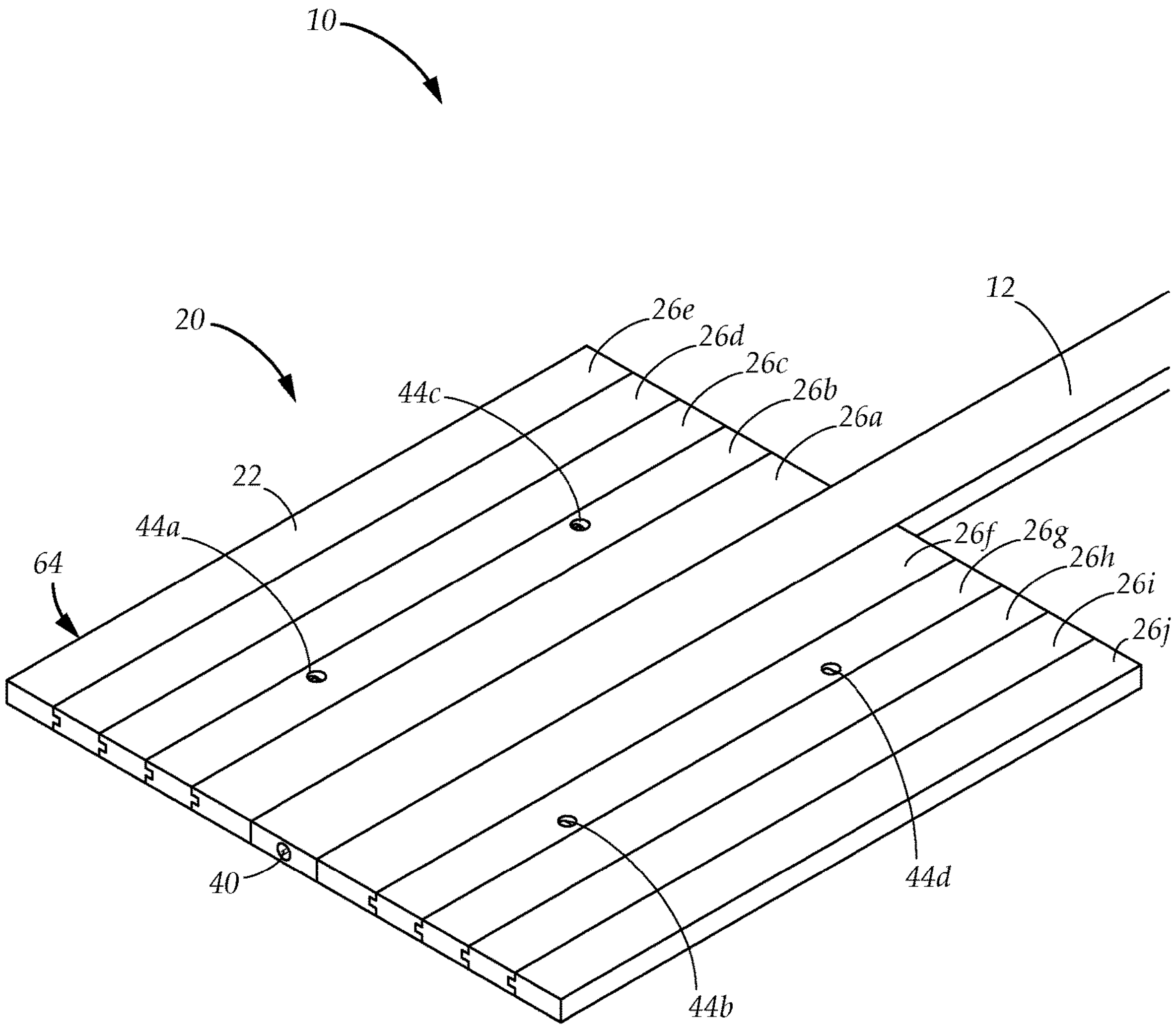
FIG. 14 is a perspective view of the pizza peel apparatus of FIG. 8 illustrating another step of the fabrication process in accordance with some embodiments.

Referring now to FIGS. 7A and 10, a method of making a pizza peel apparatus 10 may further include integrating into the channel 40 at least one branch 42*a*, 42*b*. Similar to formation of the channel 40, in some embodiments, a drill bit 72 or other suitable tool may be used to form the branch 42*a*, 42*b* by first opening a bore at the first edge 28 and/or the second edge 30 of at least one elongate bar 26*a*-26*j*. In some embodiments, the branch 42*a*, 42*b* may be opened such that it is substantially centrally disposed with respect to each of the top surface 22 and the bottom surface 24. In some embodiments, more than one branch 42*a*, 42*b* may be opened along a single edge 28, 30. Multiple branches 42*a*, 42*b* may be substantially evenly spaced along a single edge 28, 30 and/or may be substantially centered with respect to the length of the edge 28, 30.

In some embodiments, the branch 42*a*, 42*b* may be extended through a width of an entire elongate bar 26*a*-26*j* such that the branch 42*a*, 42*b* is opened in one edge 28, 30 of the elongate bar 26*a*-26*j* and exits through an opposite edge 28, 30 of the elongate bar 26*a*-26*j*. In some embodiments, the branch 42*a*, 42*b* extends through a width of more than one elongate bar 26*a*-26*j* such that that the branch 42*a*, 42*b* is opened in one edge 28, 30 of one elongate bar 26*a*-26*j* and exits through another edge 28, 30 of another elongate bar 26*a*-26*j*. In other embodiments, the branch 42*a*, 42*b* may terminate within an elongate bar 26*a*-26*j* before exiting through one of the edges 28, 30.

At least a portion of the branch 42*a*, 42*b* may extend from a portion of the channel 40 and/or may intersect the channel 40 such that the branch 42*a*, 42*b* and the channel 40 are in fluid communication. In some embodiments, the branch 42*a*, 42*b* may extend from the channel 40 in a direction away from the longitudinal axis 18 within the planar head 20. For example, in one embodiment, the branch 42*a*, 42*b* extends perpendicularly from the channel 40 with respect to the longitudinal axis 18. In some embodiments, the channel 40 and the branch 42*a*, 42*b* form a fluid path 58, as shown in FIG. 5, for example.

Referring now to FIGS. 5, 12, 13, and 14, in some embodiments, the fluid path 58 further includes at least one opening 44*a*-44*d* extending between the channel 40 and/or the branch 42*a*, 42*b* such that the opening 44*a*-44*d* is in fluid communication with the fluid path 58. In some embodiments, a method of making the pizza peel apparatus 10 includes forming one or more openings 44*a*-44*d* through the top surface 22 such that each of the openings 44*a*-44*d* is in fluid communication with the channel 40 and/or at least one branch 42*a*, 42*b*. In some embodiments, the drill 72 or another suitable tool is used to bore the opening 44*a*-44*d* through the top surface 22. The drill 72 or other tool may then extend the opening 44*a*-44*d* such that the opening 44*a*-44*d* is substantially contiguous with at least a portion of the channel 40 or branch 42*a*, 42*b*.

In some embodiments, multiple openings 44*a*-44*d* are substantially evenly distributed relative to the top surface 22 of the planar head 20. Each of the openings 44*a*-44*d* may terminate at the branch 42*a*, 42*b* such that the bottom surface 24 of the planar head 20 is continuous across its entire surface area. In this manner, airflow 52 within the fluid path 58 may be directed to exit onto the top surface 22 of the planar head 20 through the opening 44*a*-44*d*.

Figure 15:
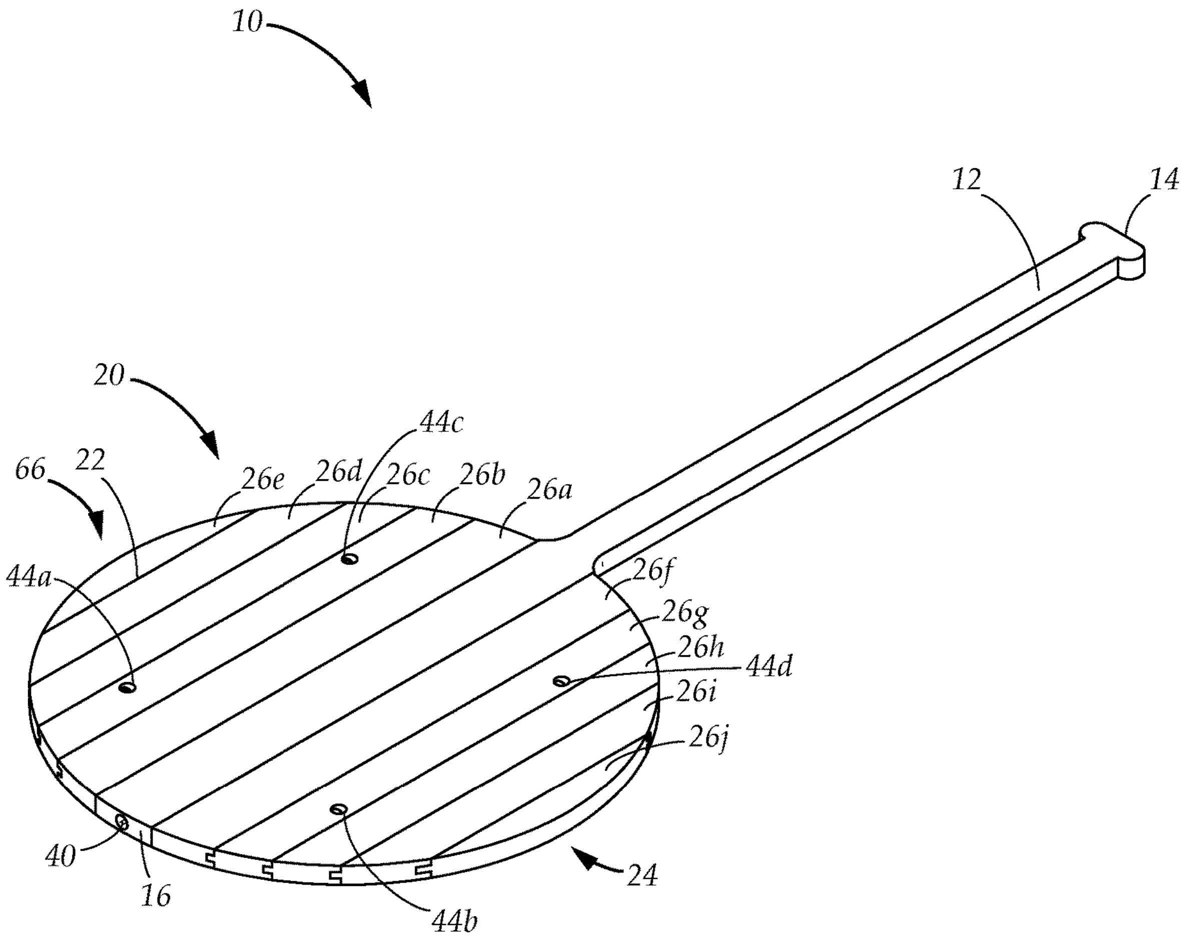
FIG. 15 is a perspective view of the pizza peel apparatus of FIG. 8 illustrating another step of the fabrication process in accordance with certain embodiments.

Referring now to FIG. 15, in some embodiments, the method includes trimming a perimeter 66 of the planar head 20 to form a circle, square, oval, polygon, or any other suitable shape having any suitable dimensions. The perimeter 66 may include each of the elongate bars 26*a*-26*j* as well as a portion of the elongate handle 12. In some embodiments, the perimeter 66 may be trimmed such that each of the elongate bars 26*a*-26*j* includes a unique size and/or shape that, when combined with the other elongate bars 26*a*-26*j*, forms a desired overall shape.

Figure 16:
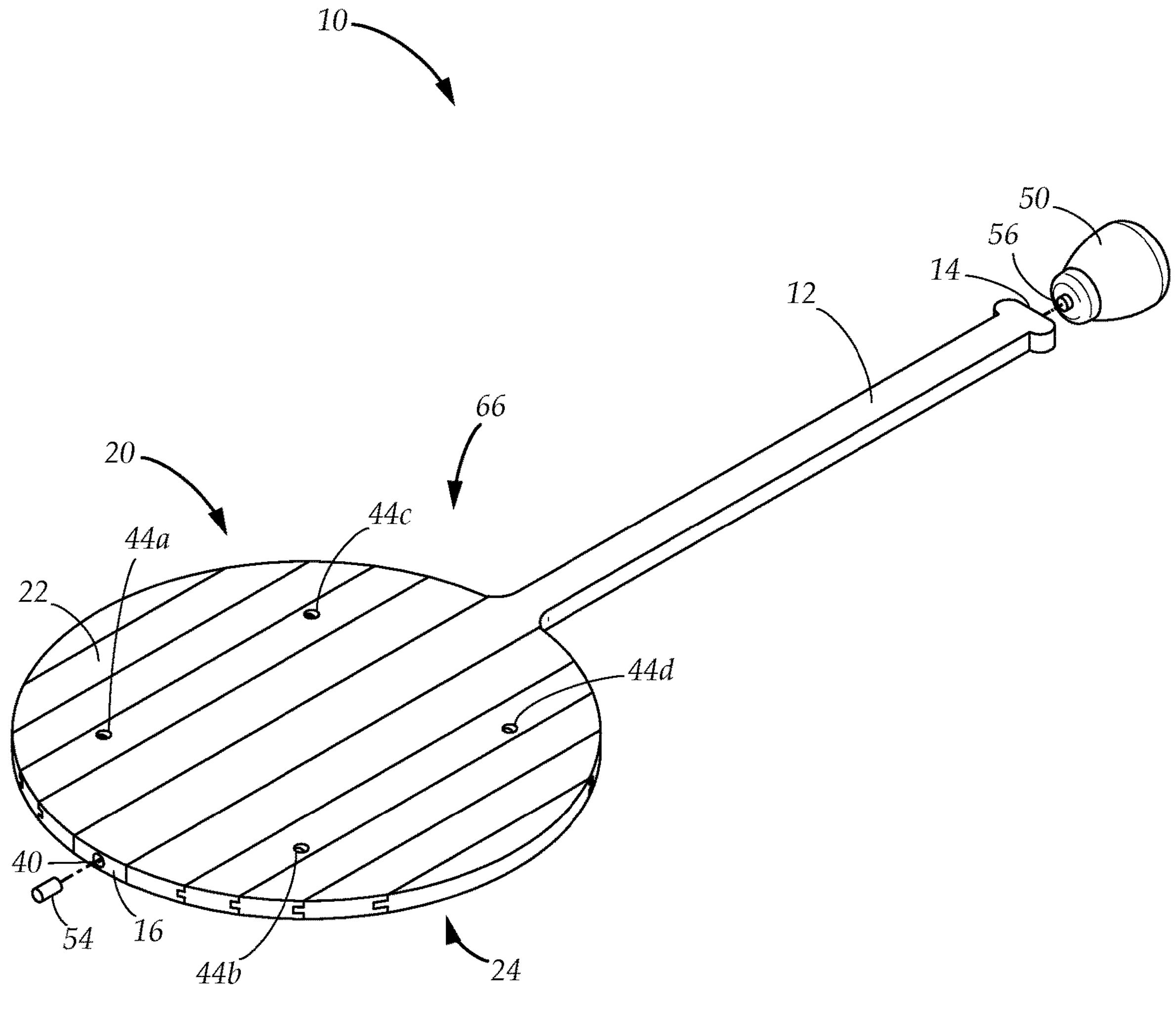
FIG. 16 is a perspective view of the pizza peel apparatus of FIG. 8 illustrating another step of the fabrication process in accordance with some embodiments.

Referring now to FIG. 16, while also referring to FIGS. 2 and 3, in some embodiments, an air pump 50 may be coupled to the first end 14 of the elongate handle 12 such that the air pump 50 is in fluid communication with the channel 40 and/or fluid path 58. In some embodiments, the channel 40 extends through the second end 16 of the elongate handle 12 such that the fluid path 58 is not closed. Thus, in certain embodiments, the method includes forming or providing a barrier element 52 having a size and shape configured to be received by and/or engaged with the channel 40 opening at the second end 16. The barrier element 54 may occlude the channel 40 to create a closed fluid path 58 such that the airflow 52*a*-52*d* may be forced to exit the fluid path 58 through the openings 44*a*-44*d*. In this manner, a sanitary and efficient airflow 52*a*-52*d* may be introduced onto the top surface 22 between the planar head 20 and a pizza or other food item retained thereon, The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

In conclusion, the disclosure is illustrated by example in the drawing figures, and throughout the written description. It should be understood that numerous variations are possible, while adhering to the inventive concept. Such variations are contemplated as being a part of the present disclosure.

What is claimed is:

1. A pizza peel apparatus configured to support a pizza, comprising:

an elongate handle extending between a first end and a second end along a longitudinal axis;

a planar head extending from the elongate handle, the planar head comprising a plurality of elongate bars forming a top surface and a bottom surface, wherein the plurality of elongate bars are coplanar and wherein each of the plurality of elongate bars comprises a first edge and a second edge, wherein the first edge of one of the plurality of elongate bars is coupled to the second edge of an adjacent one of the plurality of elongate bars;

a channel integrated into the elongate handle and extending through at least a portion of the planar head along the longitudinal axis, the channel comprising at least one branch extending in a direction away from the longitudinal axis within the planar head, wherein the at least one branch extends through more than one of the plurality of elongate bars; and at least one opening extending through the top surface from at least one of the channel and the at least one branch, wherein the at least one opening is in fluid communication with a fluid path formed by the channel and the at least one branch, wherein the at least one opening is configured to direct an airflow onto the top surface.

2. The pizza peel apparatus of claim 1, further comprising an air pump coupled to the first end of the elongate handle and configured to selectively pump air into the channel to create the airflow.

3. The pizza peel apparatus of claim 2, wherein the air pump extends along the longitudinal axis.

4. The pizza peel apparatus of claim 1, wherein the first edge of each of the plurality of elongate bars comprises a tongue element and wherein the second edge of each of the plurality of elongate bars comprises a groove element.

5. The pizza peel apparatus of claim 4, wherein the tongue element is configured to engage the groove element to couple the first edge of the one of the plurality of elongate bars to the second edge of the adjacent one of the plurality of elongate bars.

6. The pizza peel apparatus of claim 1, wherein each of the plurality of elongate bars comprises a proximal end, a distal end, and a length therebetween, wherein the length of each of the plurality of elongate bars is substantially aligned to form the planar head.

7. The pizza peel apparatus of claim 6, wherein at least a portion of the elongate handle is substantially aligned with the length of each of the plurality of elongate bars to form the planar head.

8. The pizza peel apparatus of claim 7, wherein the second end of the elongate handle is substantially aligned with the distal end of at least one of the plurality of elongate bars.

9. The pizza peel apparatus of claim 1, wherein the at least one branch intersects the channel such that the at least one branch extends in opposite directions away from the longitudinal axis.

10. The pizza peel apparatus of claim 1, wherein the at least one opening comprises a plurality of openings that are substantially evenly distributed relative to the top surface of the planar head.

11. A method of making a pizza peel apparatus, comprising:

providing an elongate handle extending between a first end and second end along a longitudinal axis;

coupling to the elongate handle at least one of a plurality of elongate bars to form a planar head having a top surface and a bottom surface, wherein the elongate handle and each of the plurality of elongate bars are coplanar;

integrating into the elongate handle a channel extending along the longitudinal axis;

integrating into the channel at least one branch in fluid communication with the channel and extending in a direction away from the longitudinal axis within the planar head, wherein the at least one branch extends in a substantially perpendicular direction through more than one of the plurality of elongate bars, wherein the channel and the at least one branch form a fluid path configured to direct an airflow therethrough; and forming through the top surface at least one opening in fluid communication with the fluid path, wherein the at least one opening is configured to direct the airflow onto the top surface of the planar head.

12. The method of claim 11, further comprising coupling to the first end of the elongate handle an air pump in fluid communication with the fluid path, wherein the air pump is configured to produce the airflow.

13. The method of claim 11, wherein each of the plurality of elongate bars comprises a proximal end, a distal end, a length therebetween, wherein coupling to the elongate handle at least one of the plurality of elongate bars comprises substantially aligning the second end of the elongate handle with the distal end of the at least one of the plurality of elongate bars.

14. The method of claim 11, wherein each of the plurality of elongate bars comprises a first edge and a second edge, wherein the first edge of one of the plurality of elongate bars is coupled to the second edge of an adjacent one of the plurality of elongate bars.

15. The method of claim 14, further comprising securing the first edge of the one of the plurality of elongate bars to the second edge of the adjacent one of the plurality of elongate bars with a fastener.

16. The method of claim 14, further comprising forming at least one of a tongue element extending along at least a portion of the first edge and a groove element extending along at least a portion of the second edge, wherein each of the tongue element and the groove element extends in a direction parallel to the longitudinal axis.

17. The method of claim 16, further comprising coupling the tongue element of one of the plurality of elongate bars with the groove element of an adjacent one of the plurality of elongate bars to form the planar head.

18. The method of claim 11, further comprising trimming a perimeter of the planar head to form a substantially circular shape.

19. The method of claim 11, wherein the at least one branch intersects the channel in opposite perpendicular directions.

20. The method of claim 19, wherein forming the at least one opening comprises forming a plurality of openings through the top surface, wherein the plurality of openings are substantially evenly distributed relative to the top surface of the planar head.

* * * * *